March 8, 1960 W. A. DANIEL ET AL 2,928,032
ACTIVATION OF FERROELECTRIC MATERIALS
Filed Dec. 7, 1956 2 Sheets-Sheet 1

INVENTORS.
W. A. DANIEL
B. B. GAULD
BY
ATTORNEY

March 8, 1960     W. A. DANIEL ET AL     2,928,032
ACTIVATION OF FERROELECTRIC MATERIALS Filed Dec. 7, 1956     2 Sheets-Sheet 2

INVENTORS
W. A. DANIEL
B. B. GAULD

BY *Ollwoodbury*

ATTORNEY

United States Patent Office 2,928,032
Patented Mar. 8, 1960

2,928,032

ACTIVATION OF FERROELECTRIC MATERIALS

William A. Daniel, Van Nuys, Calif., and Brownlee B. Gauld, Tucson, Ariz., assignors to Bendix Aviation Corporation, North Hollywood, Calif., a corporation of Delaware Application December 7, 1956, Serial No. 627,041

11 Claims. (Cl. 317—262)

This invention relates to methods of activating (polarizing) polycrystalline ferroelectric materials such as barium titanate to impart to them electromechanical properties.

A broad object of the invention is to provide more effective and more practicable methods of activating such materials.

Some more specific objects are to provide methods that: (a) produce a higher degree of activation; (b) reduce the time required to produce a given degree of activation; (c) reduce the incidence of flashover and breakdown during activation; (d) enable activation of ferroelectric bodies at desirable high temperatures while immersed in an electrically insulating liquid of a lower temperature.

Other more specific objects and features of the invention will appear from the description to follow.

The invention is applicable to all ferroelectric materials including all barium titanate base ceramics, titanates of other metals such as the alkaline earth metals, tantalates of the alkaline earth metals, niobates, lead zirconate-lead titanate, tungstenates, bismuth oxides, strontium cerate, boron phosphate, arsenic sesquioxide, lithium ferrite, antimony iodide, and mixtures of all of the above. The materials to which the invention applies may comprise 100% of a given ferroelectric material, or mixtures of one or more ferroelectric materials with or without non-ferroelectric materials for producing a specific end product. Examples of additives to barium titanate are: calcium titanate, lead titanate, calcium zirconate, strontium titanate, barium stannate and combinations thereof.

Previously known and generally used methods of activation of ferroelectric bodies involve the application to the body (by means of conductive electrodes on the surface thereof) of relatively high uni-directional potentials while immersed in an electrically insulating liquid, usually oil. The liquid increases the resistance to flashover along the surface of the body between the electrodes, and, with previous methods, determines the temperature of the body. The various methods differed essentially as to the temperature, potential, and the time of treatment employed. Thus U.S. patent to Gray 2,846,560 teaches the polarization of barium titanate by application of potential while cooling from the transformation temperature (Curie temperature) to a lower temperature. The patent to Cherry 2,538,554 teaches the application of potentials exceeding 250 volts per millimeter at temperatures below the Curie point for a substantial period of time. The patent to Howatt 2,640,165 teaches the application of about 2000 volts per millimeter at room temperature for 15 to 30 minutes. The patent to Roberts 2,702,427 teaches the application of from 2000 to 4000 volts per millimeter at temperatures below the Curie point for at least several minutes. The patent to Goodman 2,729,757 teaches the polarization of ferroelectric bodies containing lead niobate (having a Curie point of about 540° C.) by application of about 750 volts per millimeter at a temperature of 250° C. for two and a half hours. The patent to Wallace 2,724,171 teaches the use of constant current while cooling from the Curie point to a lower temperature.

The methods of the present invention are not unique as to magnitude of potential, temperature or time of treatment, but involve the new steps of electrical and attendant mechanical shock and/or the internal heating of the body being activated while immersed in a cool liquid.

In its simplest form, the invention differs from prior known methods only in that the uni-directional polarizing potential is alternately switched on and off at short intervals instead of being applied continuously. It has been found that, as compared to continuous application of the same potential, this: (1) produces a higher maximum activation; (2) activates more rapidly; (3) reduces the incidence of flashover and breakdown. The first two advantages apparently result from shock excitation of the body into vibration at its natural period each time the potential is applied. The third advantage may be explained on the theory that continued application of potential produces a progressive weakening of the resistance of the body, whereas removal of the potential for a short period restores the resistance to or nearly to its initial value. This characteristic makes practicable the use of higher potentials with resultant further accentuation of the first two advantages.

A second form of the invention is the use of uni-directional polarizing potential having an alternating component preferably of the natural or resonant frequency of the ferroelectric body being activated. This sets the body into continuous vibration, with the resultant first and second advantages listed above. In addition, the alternating electric field in the body produces heating due to mechanical movement which can be controlled to raise the temperature of the body to a desired degree for efficient activation, without materially heating the ambient insulating liquid in which it is suspended. When activation is completed, the alternating component of the potential can be removed, permitting the body to be rapidly cooled by the ambient liquid while still subjected to the uni-directional potential component. This greatly shortens the complete activating operation. Heretofore, heating and cooling of the body was accomplished by heating and cooling the liquid in which it was immersed, and considerable time is required to cool a large volume of liquid.

A full understanding of the invention may be had from the following detailed description when read in connection with the drawing.

In the drawing:

Fig. 2 is a face view and Fig. 2A is an edge view of one type of ferroelectric body tested.

Fig. 4 is a face view and Fig. 4A is an edge view of another type of ferroelectric device tested.

Figure 1:
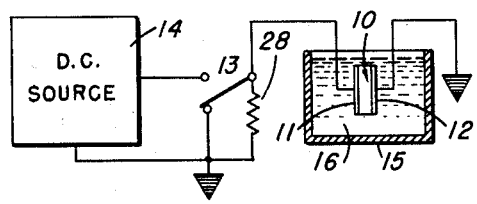
Fig. 1 is a schematic diagram of one type of apparatus that may be used in practicing the invention.

Fig. 1 shows schematically a simple apparatus that may be used for intermittently applying a uni-directional electric field to a ferroelectric body 10 having electrodes 11 and 12 on different areas thereof. In accordance with conventional practice, the body 10 is preferably immersed in insulating oil 16 in a suitable container 15. Electrodes 11 and 12 are adapted to be connected by a switch 13 either to a high potential D.C. source 14 or connected together through a ground connection shown. In operation, switch 13 is successively actuated to connect the electrodes across the source 14 and disconnect them, to permit the electrodes to discharge through a high resistance element 28. Alternatively the switch can be actuated to short circuit the electrodes 11 and 12 following disconnection thereof from the source 14.

The potential of the D.C. source 14 may be chosen in accordance with the teachings of the prior art patents. Such potentials will be hereinafter referred to as of "activating magnitude." Generally speaking the higher the potential the more thorough the activation. However, high voltages involve generating, insulating and switching problems which usually determine the limit in any particular case.

As previously indicated, it is not essential to short circuit electrodes 11 and 12 between the application of the D.C. pulses since the electrodes will discharge by leakage through the resistor 28. In fact it is not necessary that the potential be reduced to zero before each pulse is applied, but the mechanical shocking effect is greater when there is a large difference between the potential of the source and the potential existing across the electrodes at the time of connection. Discharging the electrodes by short circuiting enables application of the pulses at a more rapid rate.

Each application of the potential to the body 10 shocks the latter into mechanical vibration at its natural frequency.

The switching can be effected manually but in practice it may best be effected automatically by a power driven switch.

Figure 2:
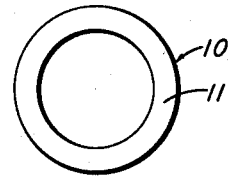
Figure 3:
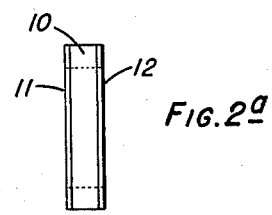
Fig. 3 is a graph showing the results of tests on bodies of the type shown in Figs. 2 and 2A.
Figure 3:
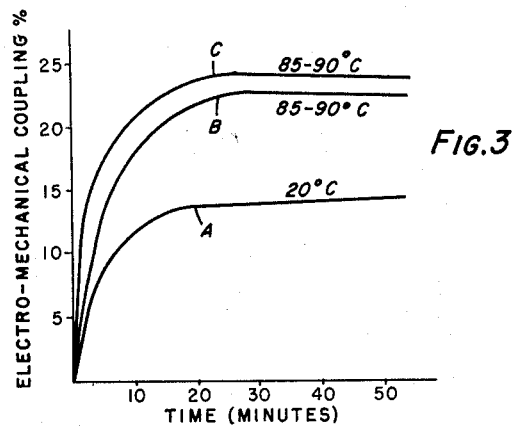

The curves of Fig. 3 show the results obtained with the new process relative to the prior art processes when applied to barium titanate rings of the shape shown in Figs. 2 and 2A in which the body is a cylindrical ring having a length of 0.2 inch, an inner diameter of 0.92 inch, and an outer diameter of 1.38 inches, with opposite electrodes 11 and 12 on the end surfaces. The D.C. potential was about 1475 volts per millimeter and the temperatures were as shown on the individual curves.

Curves A and B of Fig. 3 show the electromechanical coupling coefficients obtained with the prior art practice (continuous application of the D.C. potential) at about 20° C. and 85–90° C. respectively. Curve C shows the results using the same D.C. potential applied in pulses of three seconds duration spaced two seconds apart. It will be noted that curve C rises more rapidly than curve B and flattens out at a higher level.

Figure 4:
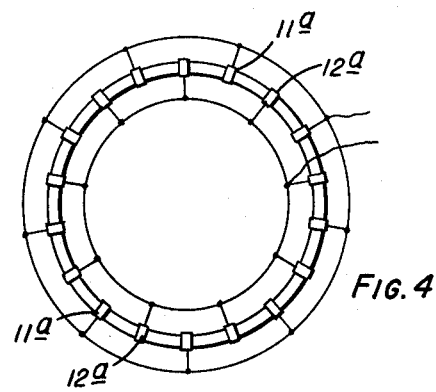
Figure 5:
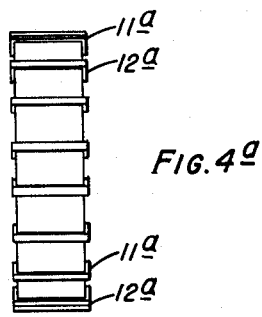
Fig. 5 is a graph showing the results of tests on bodies of the type shown in Figs. 4 and 4A.
Figure 5:
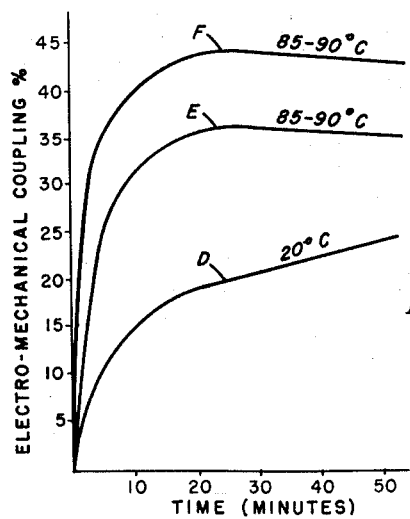

The curves of Fig. 5 show more spectacular results achieved with the present method when applied to a body as shown in Fig. 4 consisting of a ring having circumferentially spaced electrodes so that the electric field extends circumferentially in the direction of the major expansion and contraction. The rings tested had inner and outer diameters of 2.4 inches and 2.6 inches, respectively and an axial length of 0.7 inch. Eighteen electrodes including one alternate set of nine electrodes 11a and a second alternate set of nine electrodes 12a were provided, all the electrodes 11a being connected together and all the electrodes 12a being connected together. Each electrode was 1/16 inch circumferentially and extended over the inner, outer and end surfaces of the ring. Fig. 5 shows the coupling coefficients resulting from polarizing such rings with a field of 985 volts per millimeter for varying periods of time. Curves D and E show the results of the application continuously of the D.C. potential (in accordance with the prior art) at temperatures of 20° C. and 85–90° C. respectively. Curve F shows the results at 85–90° C. when the D.C. potential was discontinuously applied: three seconds on, two seconds off. It will be seen that the process of curve F yields a coupling coefficient about 9½% higher than the prior art process of curve E.

Figure 6:
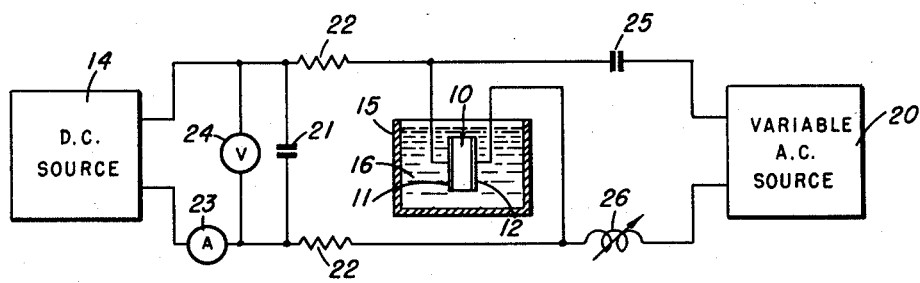
Fig. 6 is a schematic diagram of another type of apparatus that may be used for practicing the invention.

Even better results are obtainable in accordance with the present invention by maintaining the D.C. potential continuously and superimposing thereon an A.C. potential of lesser magnitude to produce a continuous pulsating potential. Fig. 6 shows an apparatus that was employed to practice this method, in which elements corresponding to Fig. 1 have the same reference numerals.

As in Fig. 1 the D.C. source 14 was connected to the electrodes 11 and 12. The electrodes were also connected to an A.C. source 20, which was adjustable both as to frequency and potential. A filter consisting of a capacitor 21 and resistors 22 was connected in the line between the source 14 and the electrodes 11 and 12 for the purpose of blocking oscillations between the electrodes 11 and 12 from the source 14. An ammeter 23 and a voltmeter 24 were provided for a purpose to be disclosed later. A blocking condenser 25 was connected between the electrode 11 and the A.C. source 20 for preventing flow of direct current from the source 14 into the source 20. A variable inductance 26 was connected in series between the source 20 and the electrode 12 to provide an inductive reactance in the series circuit equal to the capacitive reactance of the body 11 at the operating frequency. For best results, the operating frequency was adjusted to the natural frequency of mechanical vibration of the body 10.

As in Fig. 1, the body 10 was suspended in oil 16 in a container 15. However, whereas in the system shown in Fig. 1 the temperature of the body 10 during activation was controlled by heating or cooling the liquid 16, in Fig. 6 the temperature of the liquid 16 remained close to room temperature, and the body 10 was heated to a desired higher temperature by the alternating current supplied from the source 20. In operation, the source 20 was first adjusted as to frequency to match the natural frequency of vibration of the body 10 so that maximum mechanical distortion of the body was produced. The amplitude of the output of the source 20 was then adjusted to raise the body 10 to the desired temperature. The resistance of the body 10 varies with its temperature, and the temperature was determined by measuring the resistance. It was for this purpose that the ammeter 23 and the voltmeter 24 were provided. If the potential of the D.C. source 14 is maintained constant at the desired value, then the reading of the ammeter 23 will give an indication of the temperature of the body 10. The proper reading of the ammeter 23 for any desired temperature of the body 10 can be determined prior to a run of uniform bodies, by first ascertaining the ammeter reading corresponding to the particular temperature, at which the bodies are to be polarized.

Figure 7:
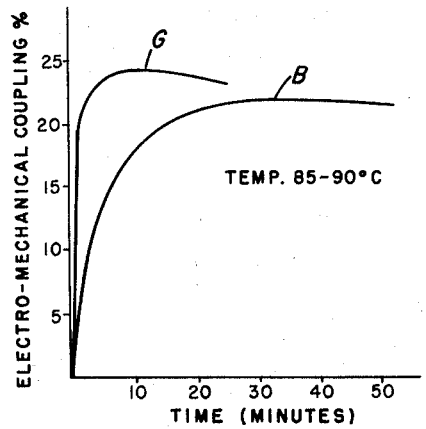
Fig. 7 is a graph showing the results of tests on bodies of the type shown in Figs. 2 and 2A by the method practiced with the apparatus of Fig. 6.

Fig. 7 shows the results of activating bodies as shown in Figs .2 and 2A with pulsating potential. Curve B is the same as curve B in Fig. 3 and shows the effect of polarizing with only a D.C. potential of 1475 volts per millimeter. Curve G shows the effect of the same D.C. potential when an A.C. power of about 150 watts was superimposed thereon. It will be observed that curve G not only rises to a substantially higher value but rises much more rapidly. The A.C. component not only reduces the time required but simplifies the heating problem when treating above room temperature. With a constant D.C. potential, the ferroelectric body must be heated by heating the ambient medium (the oil in Figs. 1 and 6). With a superimposed A.C. potential, the ferroelectric body can be heated above the temperature of the ambient medium. Curve B in Fig. 7 was obtained by heating the oil 16 to the temperature of 85° to 90° C. Curve G was obtained by heating the ferroelectric body internally to the same temperature (85° to 90° C.) by the A.C. component applied, while the oil remained substantially at room temperature.

The internal heating of the body being activated has special advantages when treating in the Curie range (about 120° C. for barium titanate) because the D.C. potential must be maintained until the body is cooled below the Curie range. With the prior processes this meant the relatively long time required for the ambient medium to cool. With the present process the body is cooled in a few seconds by the ambient medium after the A.C. potential is cut off. The D.C. potential is then cut off and the body immediately removed from the liquid medium.

The magnitude of the A.C. potential required to produce rapid activation is very small relative to the D.C. potential, and can be substantially less when of frequency matching a natural resonant frequency of the body than otherwise. The exact value may in practice be determined by the temperature to which it is desired to raise the body.

Extremely high coupling coefficients can be obtained by activating ferroelectric materials with the new process at the Curie temperature. Similar barium titanate rings as shown in Figs. 4 and 4A were activated by the prior art methods employing interrupted D.C. and pulsating D.C. respectively. Whereas a continuous direct potential gave a coupling coefficient of 39.4% the interrupted D.C. potential produced a coefficient of 47.8%, and pulsating D.C. potential produced 49.4%. In the first two tests, the D.C. potential was applied for about an hour while the bath containing the samples cooled. In the third test, the bath was not heated, the sample being heated electrically, and the entire operation was performed in only about seven minutes.

Although for the purpose of explaining the invention a particular embodiment thereof has been shown and described, obvious modifications will occur to a person skilled in the art, and we do not desire to be limited to the exact details shown and described.

I claim:

1. The method of activating a solid polycrystalline ferroelectric body which comprises simultaneously producing varying internal mechanical strains of substantial magnitude in the body while maintaining a unidirectional electric field therein of activating magnitude.

2. The method of claim 1 in which said strains are produced by repeatedly varying the magnitude of said electric field without reversing its polarity.

3. The method of claim 2 in which said electric field is varied from substantially zero to said activating magnitude.

4. The method of claim 3 in which said varying electric field is produced by repeatedly applying and removing a uni-directional potential between spaced surface areas of said body.

5. The method of claim 4 in which said potential is of sufficient magnitude to shock excite said body into mechanical vibration at its natural frequency.

6. The method of claim 5 in which the duration of each application of said potential exceeds the duration of the mechanical vibration of said body induced by said application.

7. The method of claim 2 in which said electric field is varied periodically at a frequency such as to generate continuous vibration of said body.

8. The method of claim 7 in which the magnitude of said periodic variations of said field is small relative to the average magnitude of the field.

9. The method of claim 8 in which the magnitude of said variations is sufficient to heat said body substantially above the ambient temperature.

10. The method of claim 9 including the step of controlling the magnitude of said variations to maintain said body at a desired temperature above the ambient temperature.

11. The method of claim 9 including the step of terminating said variations but maintaining said uni-directional field while said body cools by transfer of heat to the ambient medium.

References Cited in the file of this patent

UNITED STATES PATENTS

| | | |
|---|---|---|
| 2,420,652 | Chilowsky | May 20, 1947 |
| 2,592,703 | Jaffe | Apr. 15, 1952 |
| 2,702,427 | Roberts | Feb. 22, 1955 |
| 2,706,326 | Mason | Apr. 19, 1955 |
| 2,777,188 | Remeika | Jan. 15, 1957 |